United States Patent
Lawson et al.

(10) Patent No.: US 6,294,898 B2
(45) Date of Patent: Sep. 25, 2001

(54) METHOD AND APPARATUS FOR MODIFYING LIMIT AND PROTECTION SOFTWARE IN A SYNCHRONOUS GENERATOR EXCITER TO MATCH THE CAPABILITY OF THE TURBINE-GENERATOR

(75) Inventors: Rodney A. Lawson, Fincastle; William R. Pearson, Salem; James E. Curran, Roanoke, all of VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/759,268

(22) Filed: Jan. 16, 2001

Related U.S. Application Data

(62) Division of application No. 09/369,181, filed on Aug. 6, 1999.

(51) Int. Cl.[7] .................................................. H02P 9/10
(52) U.S. Cl. ................... 322/20; 322/37; 322/36
(58) Field of Search ...................... 290/40 A, 40 B, 290/40 C, 52; 322/17, 18, 19, 20, 22, 24, 36, 59

(56) References Cited

U.S. PATENT DOCUMENTS

| | | | |
|---|---|---|---|
| 3,936,722 | 2/1976 | Goto et al. | 322/20 |
| 4,200,832 | 4/1980 | Johansson et al. | 322/59 |
| 4,245,182 | 1/1981 | Aotsu et al. | 322/20 |
| 4,527,226 * | 7/1985 | Glennon | 363/41 |
| 5,264,778 | 11/1993 | Kimmel et al. | 322/25 |
| 5,305,234 | 4/1994 | Markus et al. | 364/550 |
| 5,321,308 | 6/1994 | Johncock | 290/40 C |
| 5,440,222 * | 8/1995 | Tanaka et al. | 322/25 |
| 5,483,147 * | 1/1996 | Ilic et al. | 322/25 |
| 5,604,420 | 2/1997 | Nambu | 322/19 |
| 5,698,968 | 12/1997 | Takagi et al. | 322/58 |
| 6,130,523 | 10/2000 | Hughes et al. | 322/45 |
| 6,204,642 * | 3/2001 | Lawson et al. | 322/20 |
| 6,208,120 * | 3/2001 | Gibbs | 322/59 |

FOREIGN PATENT DOCUMENTS

WO 98 34312 8/1998 (WO) ............................ H02H/7/06

OTHER PUBLICATIONS

PATENT ABSTRACTS OF JAPAN, vol. 1995, No. 06, Jul. 31, 1995 & JP 07 087798A (TOSHIBA CORP), Mar. 31, 1995, abstract.
PATENT ABSTRACTS OF JAPAN, vol. 013, No. 474 (E-836), Oct. 26, 1989 & JP 01 185198 A (NIPPON SHARYO SEIZO KAISHA LTD) Jul. 24, 1989 abstract.

* cited by examiner

*Primary Examiner*—Nicholas Ponomarenko
(74) *Attorney, Agent, or Firm*—Carl B. Horton; Kevin T. Duncan; Hunton & Williams

(57) ABSTRACT

A method and apparatus for compensating, consistent with variations in cooling conditions, protection and limit functions of a generator. Limits of the capability curve of the generator, including the overexcited region, underexcited region and region limited by stator current heating, are modified in response to changes in coolant pressure or temperature depending on the type of generator being compensated. Feedback signals and setpoints being provided to fixed protection and limit functions are intercepted and modified in accordance with the relationship between generator rated values and generator performance in view of altered coolant conditions. Protection and limit functions are automatically coordinated. As a result, overall generator performance is improved.

25 Claims, 6 Drawing Sheets

METHOD AND APPARATUS FOR MODIFYING LIMIT AND PROTECTION SOFTWARE IN A SYNCHRONOUS GENERATOR EXCITER TO MATCH THE CAPABILITY OF THE TURBINE-GENERATOR

CROSS REFERENCE TO RELATED APPLICATIONS

This is a divisional application of U.S. Ser. No. 09/369,181, filed Aug. 6, 1999.

BACKGROUND

Exciters designed for operation with synchronous generators have traditionally been required to protect the generator field by limiting operation of the generator in the overexcited region of a generator's capability curve which is restricted by field heating. In the underexcited region of the generator capability curve, operation must be limited because of stator end turn heating and stator lamination over-voltage effects. Operation between rated KVA at rated lagging power factor and rated KVA at unity power factor must be limited because of overheating caused by excessive stator current. While conventional fixed hardware or software algorithms used to implement this functionality such as General Electric's GENERREX-CPS, GENERREX-PPS, SHUNT-SCR, ALTERREX, STATIC BUS FED EXCITATION and SILCO 5 control implementations, can properly protect the generator these prior art implementations do not have any capability of being responsive to coolant conditions as they deteriorate from nominal. A further problem is that prior art limiter implementations do not account for improved coolant conditions and the possible increase in generator rating associated with such improved coolant conditions. Indeed, "ambient following" combustion turbine applications are particularly sensitive to changes in coolant conditions as the output power capability thereof varies significantly with coolant conditions.

It is thus seen to be desirable to coordinate the limit and protection functions of a generator exciter as a function of coolant conditions to provide improved overall generator performance.

SUMMARY OF THE PREFERRED EMBODIMENTS

The apparatus and method described herein accurately protect the generator as coolant conditions vary from nominal in the areas limited by (1) field heating, (2) stator current heating and (3) underexcited capability while maintaining full output capability from the generator. In a preferred embodiment, appropriate algorithms implemented in hardware or software are automatically selected to optimize the compensation for either hydrogen cooled or air cooled generators in the area of the capability curve characterized by field current or stator current heating while a jumper, or other suitable switching device, is implemented to select the proper compensation in the underexcited area. The advantages of the preferred embodiment include implementation of very accurate compensation of limiters with automatic coordination of the limiters and protection algorithms, whereby a more efficient use of a generator across varying cooling conditions is realized.

Since both limit and protection algorithms can be supplied in an exciter of a generator, it is, in accordance with the preferred embodiment, desirable that the limit and protection functions be coordinated and maintain coordination as coolant conditions change. Thus, described herein, is a very accurate apparatus and method for coordination of the limit and protection functions, as a function of coolant conditions, permitting full output capability from a turbine generator while maintaining very accurate protection functions. As an added benefit, a coolant compensated stator current limit function can be added for operation in the area of the capability curve from rated KVA at rated lagging power factor to operation at rated KVA and unity power factor.

More specifically, generators have different ratings based on the coolant conditions at the existing operating point. As noted above, prior art exciter implementations use fixed limit and protection hardware or software algorithms which either do not offer protection at other than rated coolant conditions or do not permit generator operation to increase as coolant conditions improve to obtain full capability operation of the generator. This is especially important for ambient following combustion turbine applications, as previously explained. Thus, the methodology described herein implements fixed parameter limits and protection algorithms yet provides full limit and protection compensation keyed either to temperature or hydrogen pressure (depending on the type of cooling system) to match the capability of the exciter to the generator rating. And, as a consequence, there is provided automatic coordination between the limit and protection algorithms.

In accordance with the preferred embodiment, a two part characteristic is used to implement the under excited limit (UEL). Utilizing such a two part characteristic for the under excited limit has the added benefit of providing a compensating signal for operation in the area of the generator capability curve determined by stator current heating or stator KVA. This permits the use of a fixed parameter stator current limit that is compensated for coolant conditions.

DETAILED DESCRIPTION

Figure 1:
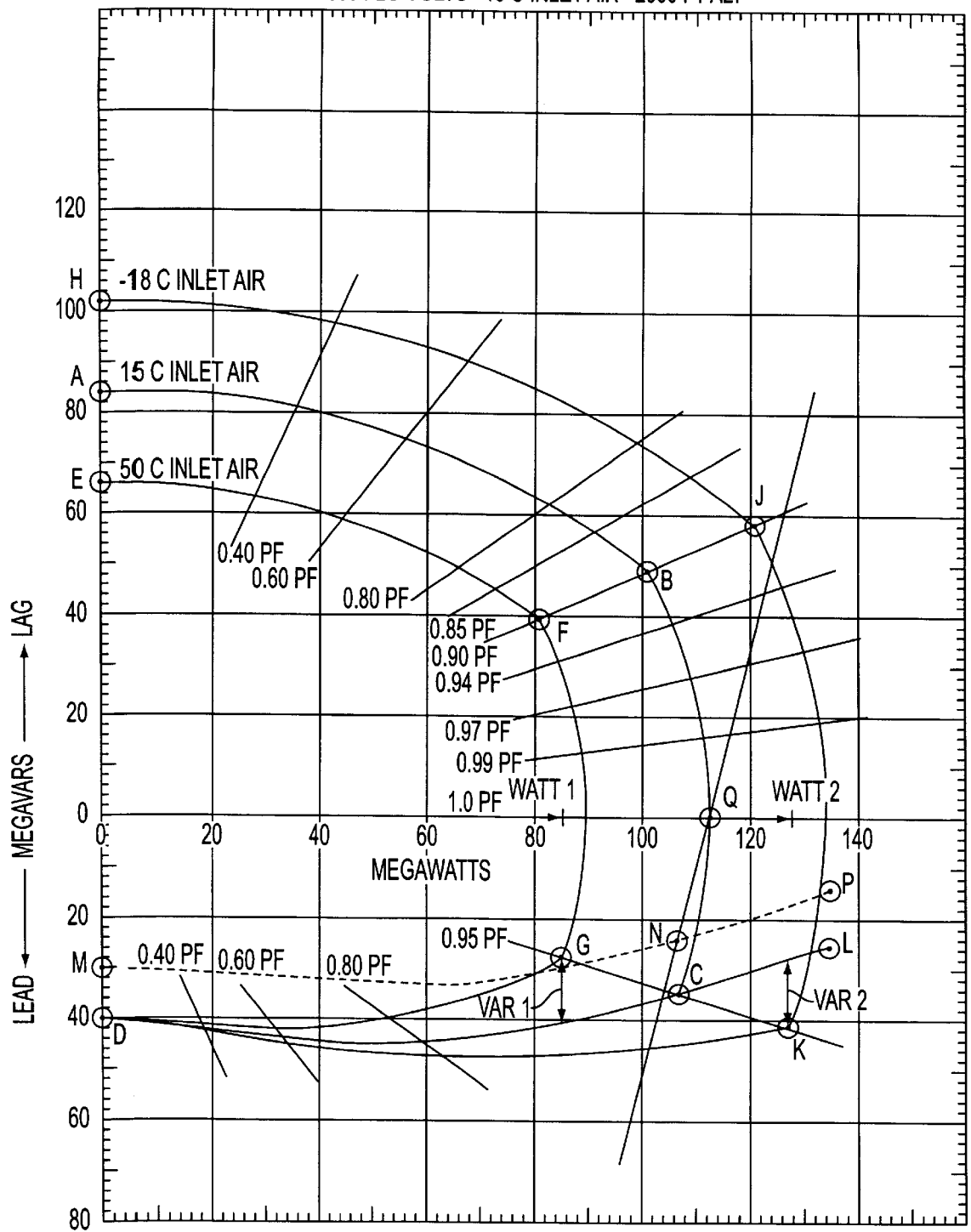
FIG. 1 illustrates a typical air-cooled generator capability curve.

FIG. 1 illustrates a typical reactive capability curve for an air-cooled generator. The generator rating at rated inlet air temperature is given by the curve through points A B C and D. Two other capability curves are shown in FIG. 1, demonstrating the capability of the generator when operating at temperatures that differ from rated. The curve from A to B is limited by field heating in the generator and results in a maximum field current value that is permitted for steady state operation. The over excited limit (OEL) and associated protection is used to limit operation of the generator in this section of the capability curve. Curve B C is limited by stator current heating. A stator current limit is used to restrict operation of the generator when the generator output falls within this region of the capability curve. Curve C D reflects the capability of the generator to operate in an area of the capability curve limited by end iron heating and stator lamination over-voltage. Curves E F G D and H J K D illustrate the generator capability at 50 Degrees C. and −18 degrees C. respectively.

Figure 2:
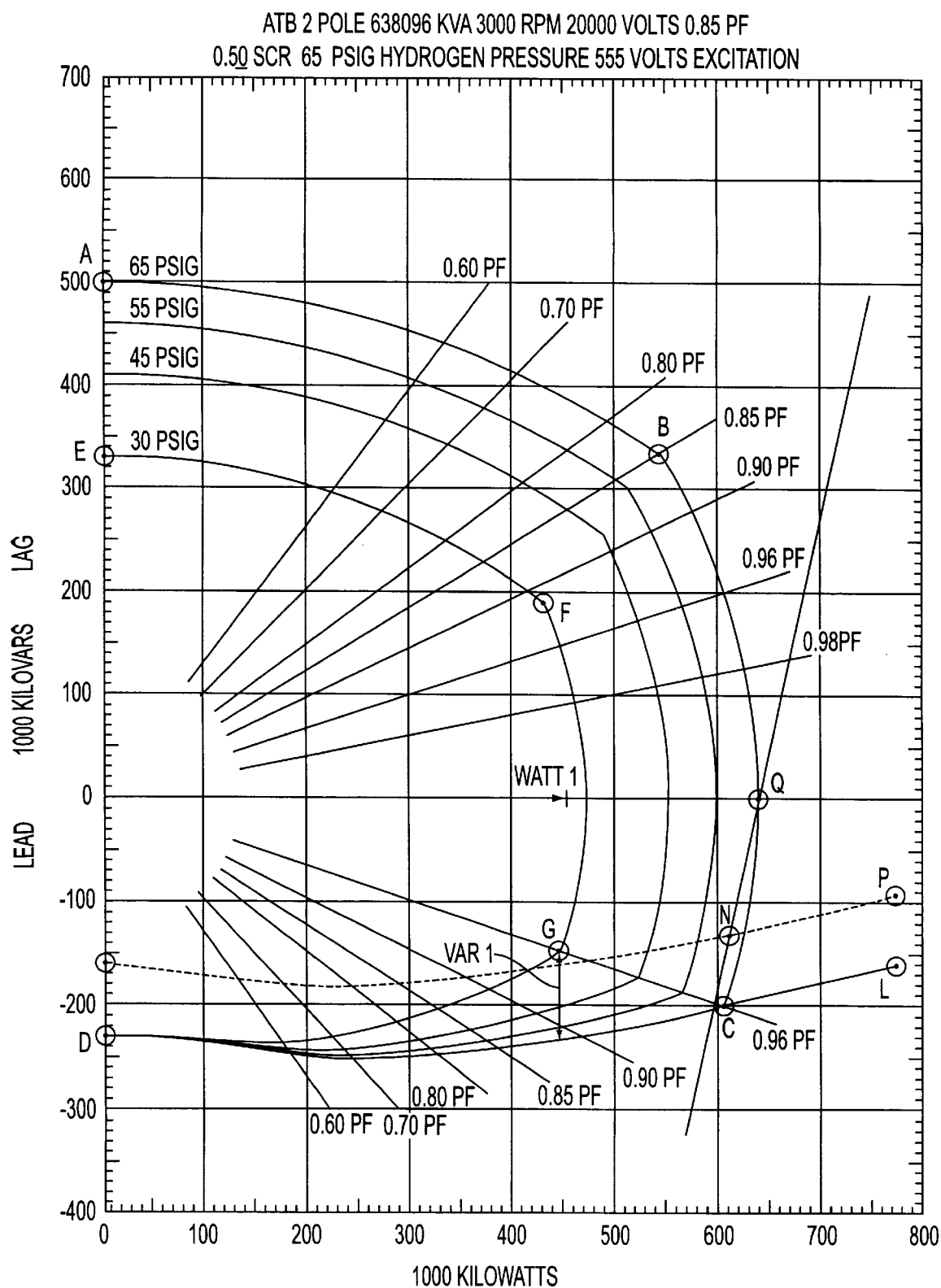
FIG. 2 illustrates a typical hydrogen-cooled generator capability curve.

FIG. 2 illustrates a typical hydrogen-cooled generator capability curve. In the case of hydrogen-cooled generators, generator rating occurs when the generator is at the maximum hydrogen pressure and the generator rating decreases as hydrogen pressure is reduced. The rated hydrogen pressure capability curve is denoted as curve ABCD in FIG. 2 and the curve for the lowest hydrogen pressure is denoted as curve EFGD. The capability curve limitations are similar to the curves in FIG. 1. That is, in FIG. 2 curve A B is limited by field heating, curve B C is limited by stator current heating, and end iron heating and stator lamination over-voltages limit curve C D.

Figure 3:
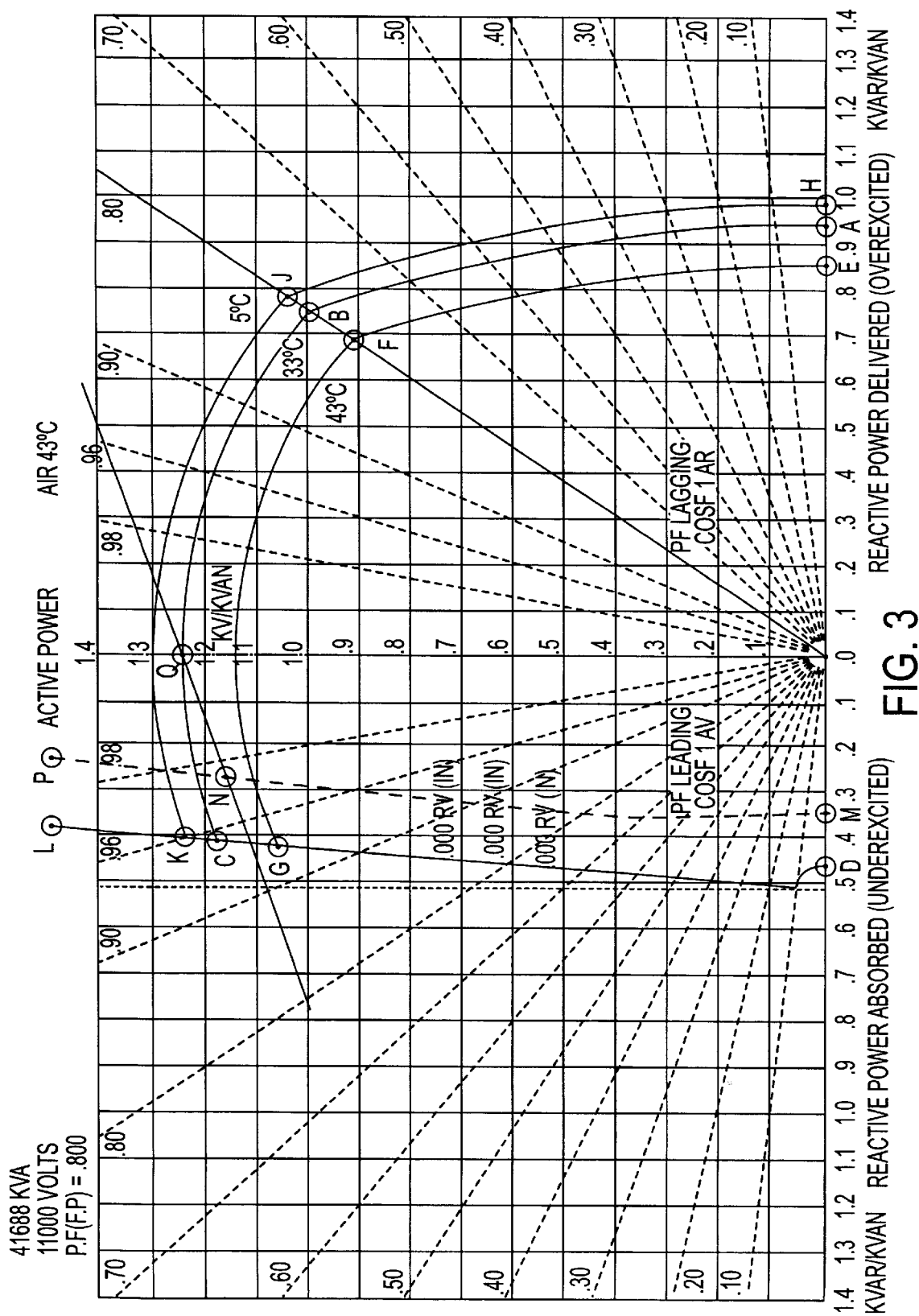
FIG. 3 illustrates a typical European manufacturer's air-cooled generator capability curve.

FIG. 3 illustrates a typical air-cooled generator capability curve from a European manufacturer. Instead of the common US practice of showing the zero power axis on the left side of the graph, the standard European practice, as illustrated in FIG. 3, is to show the zero power point on the right. The capability curve limitations are similar to the curves in FIG. 1. Curve A B is limited by field heating. Curve B C is limited by stator current heating. End iron heating and stator lamination over-voltages limit Curve C D. The curves from C to D, G to D and K to D illustrate a difference between these generators and the standard U.S. air-cooled generators. None of these curves shows any variation with coolant temperature.

In accordance with the preferred embodiments discussed herein, there is provided limiters and protection apparatus and methods (hereinafter "algorithms" or "functions") for exciters for synchronous generators. Specifically, the limiters disclosed herein, through regulator action, limit operation of the exciter and generator to acceptable operating areas of a generator's capability curve. Protection algorithms, on the other hand, preferably do not have any regulator functions but instead generate trips in response to operation of the exciter and generator outside the capability curve of the generator. As described herein there is provided limiter algorithms that actively force the exciter to operate within the capability curve in steady state conditions and can be compensated for coolant conditions.

Further, the preferred embodiment permits transient penetration of a coolant compensated forbidden area of the capability curve for system events, thus maximizing the contribution of the generator to system stability. By implementing similar algorithms for the limiter and protection functions it is possible to effectively coordinate between the limiter and protection functions. Consequently, it is possible, in the instance of the OEL, to ensure that the limiter, if it is working, will limit operation of the generator to the coolant compensated area of the generator capability curve limited by generator field heating. This ensures that the protection does not trip undesirably, thereby maintaining the generator on-line for longer periods and during periods during which conventionally would result in a tripping situation. In other words, the limiter algorithms control the amount of current flowing in the field winding and does so in coordination with protection algorithms.

Specifically, in the field circuit of a generator, the total temperature of the field winding is an important criterion. The total field winding temperature is affected by the field current in the winding and the condition and temperature of the coolant. Generally, generators used in steam turbine applications tend to operate at a fixed cold gas temperature and do not follow ambient temperature variations. In this instance, the gas pressure varies instead and the capability of the generator decreases with lower gas pressures. The relationship between the generator field current and gas pressure in a gas cooled generator can be defined as a log-log function which is well known to those skilled in the art. Specifically, if the present gas absolute pressure is (PGAS+14.7) lbs/in$^2$ (hereinafter units of pressure and temperature, e.g., degrees C, are to be understood, although not expressly stated) then the maximum allowable field current at that pressure is $$IF@PGAS = IF\_RAT*((PGAS+14.7)/(PGAS\_RATED+14.7))^{(H2FEXP/10000)} \quad (1)$$

IF_RAT (rated field current) and the term H2FEXP can be determined from generator data for a particular application. IF@PGAS is the field current rating specified by the manufacturer at a particular gas pressure. H2FEXP is an exponent that can be estimated from the field current and hydrogen pressure data supplied by the generator manufacturer and the "10000" divisor in Equation (1) results from the specific implementation used to relate digital counts to engineering units. Generally, the term (H2FEXP/10000) varies between 0.4 and 0.5 for typical hydrogen cooled generators. The preferred embodiment maximizes the accuracy of the approximation illustrated in Equation (1) for raising the ratio of the two absolute temperature signals to a power that varies between 0.4 and 0.5.

In this regard, both sides of Equation (1) can be divided by IF_RAT which yields, on the right hand side of such a modified Equation (1), a multiplier which is used to modify (a) feedback signals and/or (b) limit reference setpoints. This permits implementation of protection functions and limiters that are capable of being compensated for coolant changes while still using fixed algorithms for the protection and limiter functions.

Figure 4:
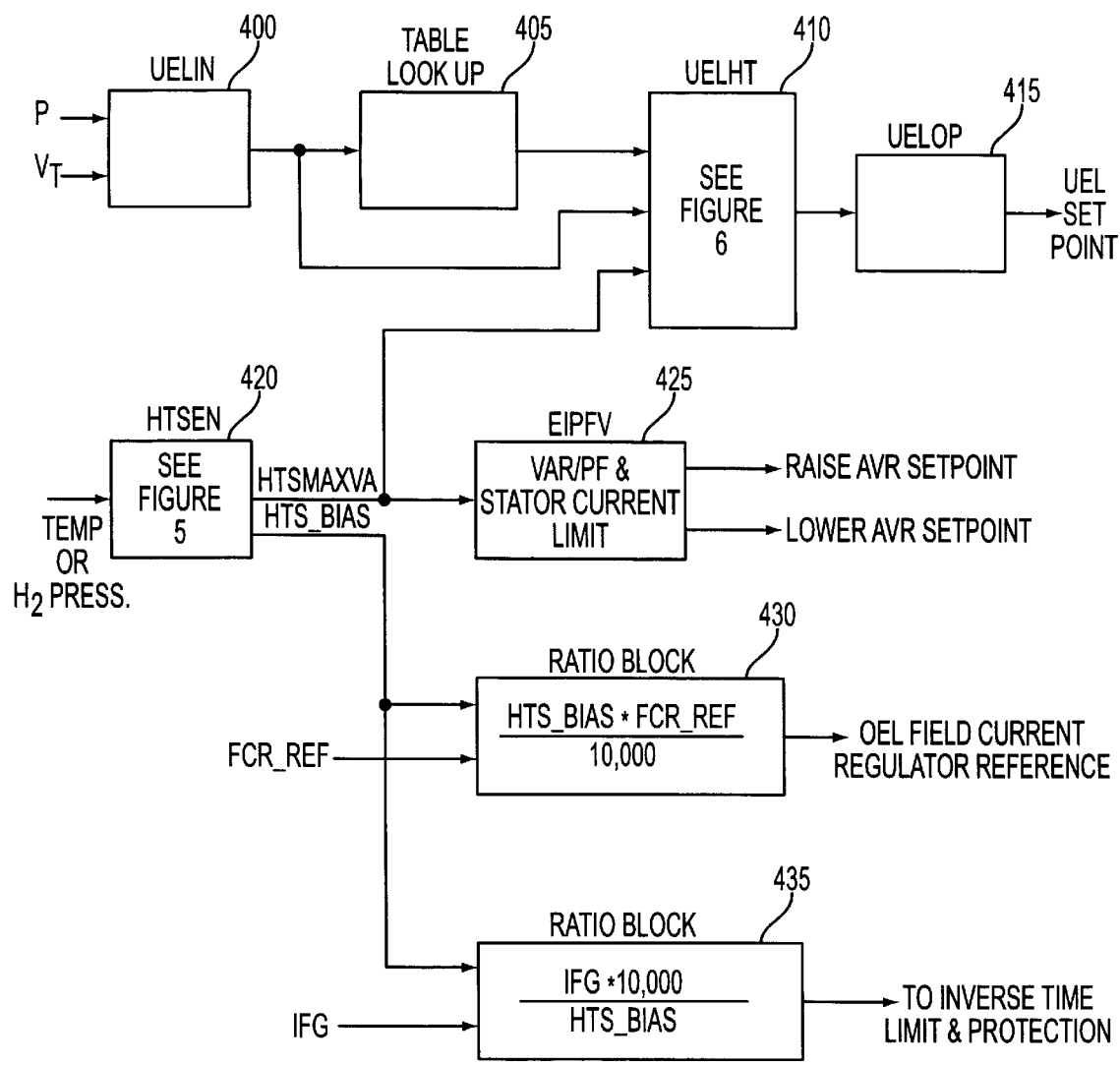
FIG. 4 illustrates a block diagram showing fixed limiters and protection with coolant compensation in accordance with a preferred embodiment.

FIG. 4 illustrates a block diagram of the preferred implementation of a coolant compensated under excited limit (UEL), OEL (both limiter and protection) and stator current limit. Only the blocks pertinent to the implementation of coolant compensation are described in detail. The block labeled UELIN, block 400, is the input block for the UEL function and provides the functions of normalizing by 1/VT^2, low pass filtering, enabling and an absolute value circuit. Inputs power P and terminal voltage V$_T$ are provided to block 400. The table look up, block 405, is an arbitrary function generator, used to implement the capability curve from point C to D on the rated coolant capability curve. The block labeled UELOP, block 415, is used to remove the 1/VT^2 normalization from the coolant compensated Var reference, the output from the UELHT block, block 410. The block E1PFV, block 425, uses the signal HTSMAXVA (explained below) to modify the stator current limit reference so that raise and lower commands are issued to an automatic voltage regulator (AVR) (not shown) to limit stator current consistent with the coolant conditions. Ratio block 430 is used to modify the OEL field current regulator reference. Ratio block 435 is used to modify the field current feedback signal to the limit and protection algorithms.

Figure 5:
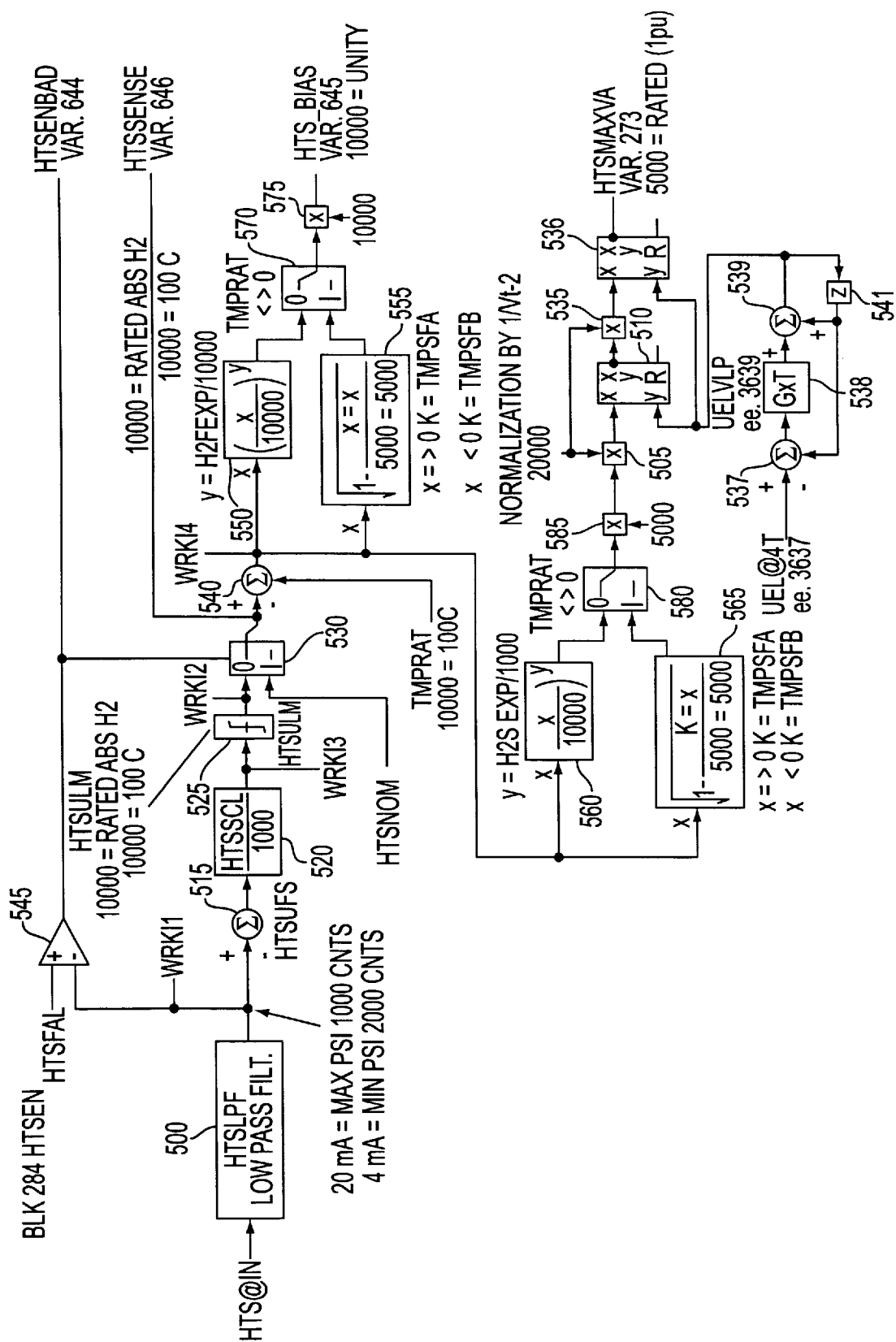
FIG. 5 illustrates a hydrogen pressure and ambient temperature input sensor in accordance with a preferred embodiment.

FIG. 5 illustrates a preferred technique to develop a multiplier (HTS_BIAS) to compensate the over excited limiter (OEL) and protection algorithms for hydrogen cooled generators. The term HTS@IN is the output signal of a hydrogen pressure transducer associated with the cooling system of the generator (not shown) and generally supplied by the generator manufacturer. This signal is passed through low pass filter 500 to remove undesirable AC components. Further, the term HTSOFS (hydrogen temperature sensor offset) is selected to remove, via summing block 515, any offset resulting from the use of, for example, a 4–20 ma current signal for transmitting hydrogen pressure (as embodied in HTS@IN). In the case of hydrogen cooled generators, the current signal is indicative of coolant conditions, as discussed previously herein. It is common practice to use an offset transducer (4–20 ma) so that a zero signal level is not permitted and signal levels less than, for instance 2 mA., can be interpreted as an open wire.

The term HTSSCL (hydrogen temperature scalar) in scaling block 520 provides the ability to scale the absolute hydrogen pressure signal for 10000 counts at rated absolute pressure. The use of the 10000-count divisor is arbitrary and any suitable value can be used depending on implementation considerations. The term HTSFAL (hydrogen temperature sensor failure), fed to comparator 545, permits detection of a failure in the input signal (HTS@IN) from the transducer that results from, e.g., an open wire. This is used to generate a signal HTSENBAD (hydrogen temperature sensor bad) for diagnostic purposes (as desired) and preferably to switch, via switch 530, the input signal to a value HTSNOM (hydrogen temperature sensor nominal) so that no compensation is applied when the sensor or transducer fails. HTSSENSE provides a diagnostic signal representative of the output of switch 530, Block 525 provides an upper limit (HTSULM) and lower limit (HTSLLM) for the value exiting scaling block 520.

TMPRAT (rated temperature) is entered as a zero in this instance resulting in the automatic selection of the uppermost path, namely function block 550, shown on the right hand side of FIG. 5. This results in the generation of HTS_BIAS (the multiplier) for compensating, as a function of hydrogen absolute pressure, the OEL and protection. In the preferred implementation, HTS_BIAS is scaled, in multiplier block 575, for 10000 counts equal to unity ratio. The preferred technique is to use a ratio block (FIG. 4) to multiply the feedback signal (IFG) to an inverse time protection algorithm by 10000/HTS_BIAS and the reference to the OEL (FCR_REF) by HTS_BIAS/10000 (ratio blocks 435 and 430 respectively) thereby providing compensated reference values to the fixed limit and protection algorithms.

In contrast to steam powered generator applications, generators powered by combustion turbines operate in an ambient following mode at a fixed gas pressure (which would be zero for an air-cooled machine). The relationship between field current and gas temperature is based on quadratic interpolation functions that are well known by those skilled in the industry. For gas temperatures less than rated, the equation for field current is given by $$IF@TLOW=SQRT((IF\_RAT^2+TMPSFB*(TGAS-TGAS\_RATED)))$$

For gas temperatures greater than rated, a different interpolation function is more appropriate and is given by $$IF@THIGH=SQRT((IF\_RAT^2+TMPSFA*(TGAS-TGAS\_RATED))) \quad (3)$$

The coefficients TMPSFA and TMPSFB can be determined, using Equation (2) or (3), from generator data supplied by the generator manufacturer relating field current at a given coolant temperature to field current at rated temperature. Similar to hydrogen pressure compensation, both sides of Equation (2) and (3) can be divided by IF_RAT to yield a multiplier that can be used to modify feedback signals and/or modify limit setpoints so that fixed protection and limiter algorithms can be used. In the preferred implementation this multiplier is again called HTS_BIAS and is scaled, in multiplier block 575, 10000 counts for unity ratio. The preferred implementation automatically selects between hydrogen pressure or temperature compensation based on the entry of rated temperature (TMPRAT). That is, a value of 0 for TMPRAT results in selecting hydrogen pressure compensation while a non-zero value for TMPRAT selects temperature compensation, via switch 570. As with hydrogen pressure, the preferred implementation utilizes an offset current signal so that an open wire condition can be easily detected. In the case of temperature, a non-zero input is required for TMPRAT so that a signal WRK14, which represents the difference between the actual temperature and rated temperature, can be calculated by summing block 540. Because TMPRAT has a value other than zero, the lower path, namely, function block 555, on the upper right hand side of FIG. 5 is selected, via switch 570. This results in a correct implementation of Equation (2) or (3) when both sides of Equation (2) or (3) are divided by IF_RAT with IF_RAT replaced by a count value of 5000 counts. 5000 counts is used because equipment is typically scaled for 5000 counts at AFFL (where AFFL is the field current required at full load, rated power factor and at rated temperature). This count value, however, is arbitrary and can be changed depending on implementation circumstances. The preferred technique is to use a ratio block to multiply the feedback signal to the inverse time protection algorithm by 10000/HTS_BIAS and the reference to the OEL (FCR_REF) by HTS_BIAS/10000 as shown in FIG. 4, blocks 435, 430. That is, the feedback signal is intercepted and modified in the desired manner.

The Under Excited Limit (UEL) preferably should account for end iron heating, stator lamination over voltage and steady state stability concerns in arriving at a setting which will adequately protect the generator and maintain system stability.

Figure 6:
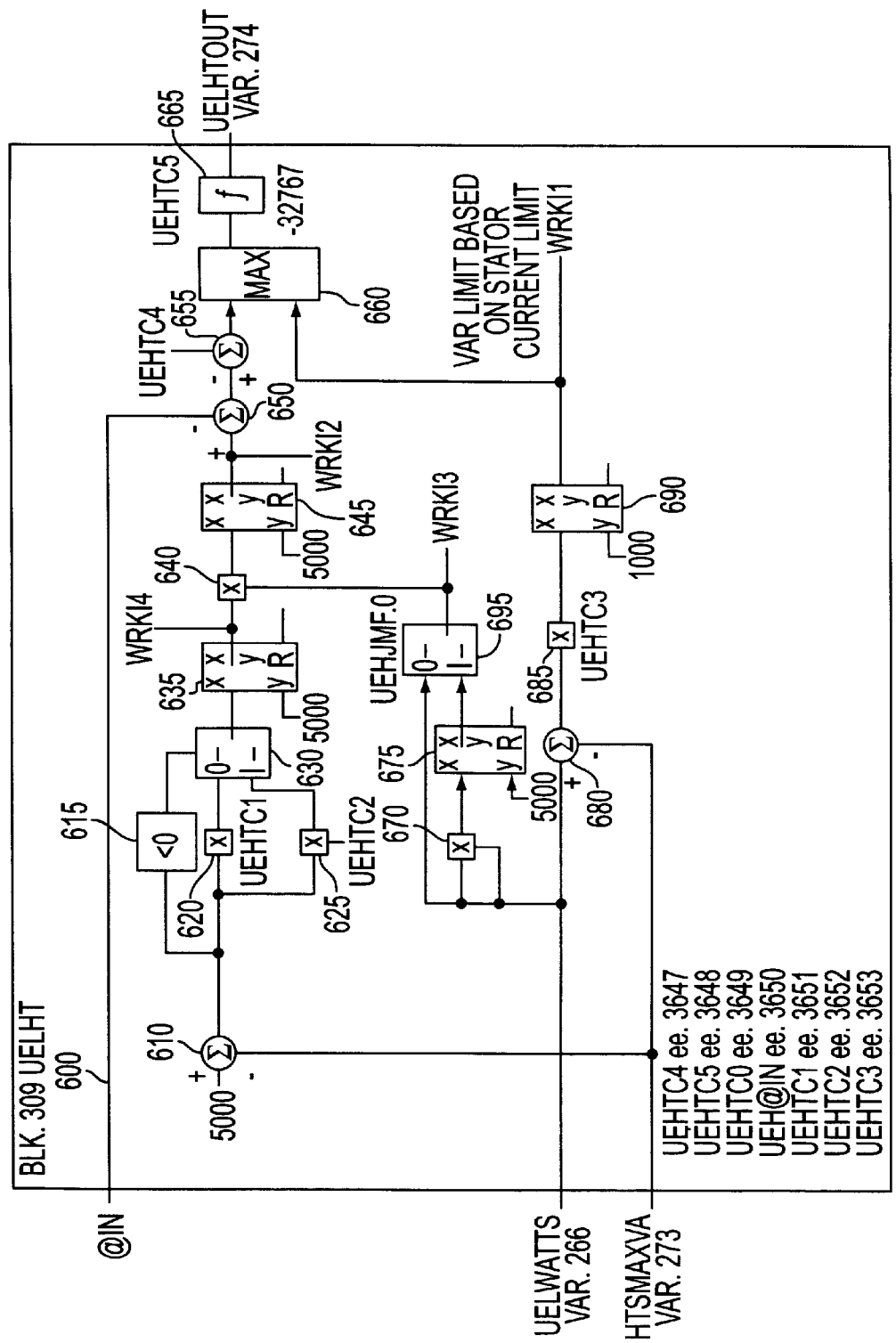
FIG. 6 illustrates an underexcited limiting and stator current limiter arrangement for compensation of hydrogen pressure and ambient temperature in accordance with a preferred embodiment.

FIG. 1 illustrates a typical generator capability curve for an air-cooled combustion turbine driven generator. In a preferred embodiment there is provided a method and apparatus for modifying the UEL in the area of the generator capability curve limited by end iron heating and stator lamination over voltage effects by modifying a function generator. The function generator is used to approximate the under excited capability of the generator (shown as curve CD in FIG. 1). The generator underexcited capability at zero real power is a single value and then varies at other power levels based on either coolant temperature or coolant pressure. A preferred UEL coolant compensation implementation is illustrated in FIG. 6. The function generator output is shown as UEH@IN in FIG. 6 and is used as an input to summing block 650 of UELHT block 410. The preferred implementation then modifies the function generator output by a function that varies with the coolant condition (5000-HITSMAXVA)*(UEHTC1 or UEHTC2) (where HTSMAXVA varies with coolant condition) times either the real power or real power squared, as depicted by function blocks 615, 620, 625, 630, 670 and 675. Generally, best results are obtained using real power for hydrogen-cooled generators and real power squared for air-cooled generators. Jumper or switch block 695 is used to select either real power with a setting of 0 or real power squared with a setting of 1. UEHTC1 is a coolant coefficient used to modify the function generator output as a function of hydrogen pressure or ambient temperature (for ambient temperature greater than rated) and UEHTC2 is a coolant coefficient used to modify the function generator output for ambient temperature less than rated. From the generator capability curves illustrated in FIG. 1, the function generator, block 405, is selected to approximate the curve DCL where the curve from C to L is just an extension of the rated temperature curve from rated KVA at 0.95 power factor to a real power point equal to 120% of the rated KVA. For the case shown in FIG. 1, margin e.g. 10%, is added to the capability curve using UEHTC4 and results in the dashed curve MNP. To complete the desired UEL characteristic, a straight-line is added through points N and Q and a "max value" selection is made using block 660 of FIG. 6. The slope of the line through N and Q in FIG. 1 is calculated as (sin(arccos(0.95)−margin))/(1−0.95). UEHTC3 is then found by multiplying the slope of the line through N and Q by 1000. For the capability curves in FIG. 1, UEHJMP.0, block 695, is set to a 1 for a second order interpolation and UEHTC1 is found using the following formula $$UEHTC1 = 5000*VAR1*GEN\_MVA^2/(WATT1^2*(GEN\_MVA-MVA@WATT1)) \quad (4)$$

Where VAR1 is the difference in MVARS between the high temperature generator capability curve at point G and the rated temperature capability curve DCL. GEN_MVA is the rating of the generator at rated temperature, WATT1 is the rating in MWATTS at point G, and MVA@WATT1 is the MVA rating of the generator at point G. Similarly, UEHTC2 is found using data from the low temperature capability curve DK and is given by the equation $$UEHTC2 = 5000*-VAR2*GEN\_MVA^2/(WATT2^2*(GEN\_MVA-MVA@WATT2)) \quad (4)$$

Where VAR2 is the difference in MVARS between point K and the rated generator capability curve DCL, WATT2 is the MWATT rating of point K and MVA@WATT2 is the MVAR rating of point K.

For the case of a hydrogen-cooled generator, UEHJMP.0, block 695, is set equal to 0 for a linear interpolation with power and UEHTC1 is given by the equation $$UEHTC1 = 5000*(VAR1*GEN\_MVA)/(WATT1*(GEN\_MVA-MAXVA)) \quad (5)$$

Where VAR1 is the difference in MVARS between the curve at lowest hydrogen pressure and most leading power factor for which constant stator MVA is maintained and the curve at rated hydrogen pressure. WATT1 is the rating in MWATTS of the generator at the lowest hydrogen pressure and most leading power factor for which constant stator MVA is maintained. MAXVA is the MVA rating of the generator at the lowest hydrogen pressure. Because hydrogen pressure is assumed to be at rated or less, UEHTC2, block 625, is entered as zero. The margin is entered in UEHTC4, block 655, and the slope in UEHTC3, block 685, as was done for the air-cooled generator.

FIG. 5 illustrates the preferred method for obtaining a value for the term HTSMAXVA. The generator KVA varies as a logarithmic function of absolute hydrogen pressure for hydrogen cooled generators, but is defined by a quadratic interpolation function for air cooled generators. This is similar to the variation of field current with coolant conditions, but different exponential coefficients for hydrogen cooled generators and quadratic interpolation functions for air cooled generators are appropriate. These functions are shown in the bottom half on the right side of FIG. 5 and result in the generation of signal HITSMAXVA that is scaled for 5000 counts in block 585 at a ratio of MAXKVA/GEN_KVA of unity. As in the case of field current, the preferred embodiment of HTSMAXVA automatically selects hydrogen pressure if TMPRAT is entered as zero, block 580. The value to use for air-cooled generators is selected based on whether temperature is greater than or equal to rated or less than rated, blocks 560, 565 and 580.

To properly normalize HTSMAXVA to account for variations in generator terminal voltage requires that HTSMAXVA be divided by per unit generator voltage squared. This is accomplished in FIG. 5 using blocks 505, 510, 535, 536, 537, 538, 539, and 541. Blocks 537, 538, 539 and 541 comprise a digital low pass filter with a filter time constant, UELVLP entered in block 538. Filtered generator voltage is used to remove any interactions with local generator dynamics. Ratio blocks 505 and 510 are used to divide the output of block 585 by per unit generator voltage. One of the inputs to multiplier block 505 is 20000 resulting in a multiplication of the signal from block 585 by 20000. Block 510 is a ratio block that divides the input at x, 20000 times the output from block 585, by the input at y, filtered generator voltage. The value 20000 is used in this particular implementation for rated generator voltage. Any suitable value could be used. Blocks 535 and 536 then divide block 585-output/per-unit generator voltage by per unit generator voltage resulting in the desired signal at the output of block 536 being properly compensated by (1/(per unit generator voltage squared)).

Typically, generators have the capability of operating underexcited at rated KVA to some leading power factor, which may or may not be the same as rated lagging power factor. This is illustrated by point C on FIG. 1. When this power factor point is reached there is a discontinuity in the curve that determines the under excited limit. The under excited limit for real power levels that exceed the discontinuity is determined by the constant KVA or stator current curve which is a straight line with constant slope through points N and Q of FIG. 1. If one were to try to modify the output of the function generator UEH@IN of FIG. 4 to account for the discontinuity, it would be difficult to obtain a single compensation term because the slopes are very different in the two areas, as can be readily seen in FIG. 1. In the preferred implementation a high value gate 660 (FIG. 6) is used to select between the compensated function generator output from summing block 655 (discussed below) and the output from the compensated constant KVA function, divider block 690. While it would be possible to generate the constant KVA function exactly, the preferred implementation utilizes a straight-line approximation to the constant KVA function. This is done to eliminate the possibility of infinite (or very large) slope (delta Vars/delta Watts) in the constant KVA function resulting in infinite or very high gain which would adversely impact the stability of the under excited limit (UEL). This is accomplished in the preferred implementation as shown in FIG. 6.

Specifically, a signal proportional to the maximum KVA at a given coolant condition (HTSMAXVA) is subtracted, in summing block 680 from the real power signal (UELWATTS). The desired slope (UEHTC3/1000) then multiplies this difference, via blocks 685 and 690. The result is a straight line limiter characteristic that varies with generator coolant conditions having a fixed slope that provides limiter operation in the generator constant KVA section of the generator capability curve (curve NQ). Using a fixed slope avoids the potential for instability caused by infinite or very large slope in the delta Vars/delta Watts's characteristic if the actual constant KVA curve were implemented. UEHTC4, input to summing block 655, provides for margin to be added to the function generator part of the underexcited capability curve. This permits the user to enter points from the actual capability curve (DC of FIG. 1) and then include the margin as a separate input. The straight-line limit passes through points N&Q.

FIG. 2 illustrates a typical generator capability curve for a hydrogen-cooled generator. The rated capability curve for a hydrogen-cooled generator is shown as curve ABCD in FIG. 2 and occurs at the maximum generator hydrogen pressure. Ratings at other than rated pressure result in less generator capability. As in the case of air-cooled generators, curve DCL is the underexcited capability of the generator and is set using the arbitrary function generator, block 405, in FIG. 4. Margin is added to the curve using UEHTC4, block 655 of FIG. 6, resulting in curve MNP in FIG. 2. For hydrogen cooled generators, UEHJMP.0, block 695, is set to a zero resulting in a linear interpolation with UELWATTS. UEHTC1, block 620, is set to $$UEHTC1=5000*VAR1*GEN\_MVA/(WATT1*(GEN\_MVA-MAX\_MVA) \quad (6)$$

Where VAR1 and WATT1 are shown on FIG. 2 and MAX_MVA is the MVA rating of the generator at point G of FIG. 2. Because hydrogen pressure is assumed to always decrease from rated, UEHTC2, block 625, is set to zero. As with the air-cooled generator, the UEL characteristic is determined by a maximum value select circuit, block 660 in FIG. 6, between the curve MGP and a straight line segment through NQ of FIG. 2. Blocks 680, 685, and 690 of FIG. 6 are used to generate a straight-line segment with a slope determined by UEHTC3, block 685. Block 690 is used to normalize the slope, 1000 counts equals unity slope. UEHTC5, block 665, is used to limit the UEL reference between −32767 counts and UEHTC5 counts.

Utilizing a two-part characteristic for the UEL curve provides the ability to approximate the generator under excited capability curve when there is no variation with coolant conditions for generator output levels less than rated KVA. This is a common practice, particularly with European generator manufacturers, and results in a single underexcited capability curve up to the constant KVA portion of the capability curve. This is shown as FIG. 3. At generator KVA output levels less than rated for the given coolant condition, the UEL characteristic is determined by the function generator output, 600 in FIG. 6. The function generator output will not be modified as a function of coolant if coolant coefficients UEHTC1, block 620, and UEHTC2, block 625, are set equal to zero. All the variation with coolant condition occurs in the constant KVA region and can be accommodated by selecting the proper slope using UEHTC3, block 685. The middle temperature curve is selected as the rated temperature curve. At point C of FIG. 2, add the desired margin to the MVAR rating in per unit (sin(arccos(0.95)−0.1). The slope from FIG. 2 is then found from $$\text{Slope}=(\sin(\arccos(0.95))-0.1)/(1.24-(0.95*1.24))) \quad (7)$$

UEHTC3, block 685, is found by multiplying the slope by 1000 and UEHTC4, block 655, is found by multiplying the margin in per unit by 5000. Curve MNP of FIG. 3 illustrates the capability of the generator in the underexcited region with the appropriate margin added by UEHTC4. The straight line through points NQ illustrates the capability in the constant stator MVA part of the capability curve. The slope of the line is determined by UEHTC3, block 685, and normalized by block 690. Variation with ambient temperature is accomplished by varying HTSMAXVA, block 565 of FIG. 5. The UEL characteristic is determined by a max selection of the function generator with margin, block 655, and the compensated straight line slope, block 690, using a max select function, block 660.

In the overexcited part of the capability curve (curves AB, EF, and HJ of FIG. 1), field heating is the limiting parameter and a technique has been described for implementing an over excitation limiter (OEL) which can be compensated for coolant conditions to enable the exciter to adequately protect the generator field and yet provide transient forcing capability for system events. In the underexcited part of the capability curve, it has been shown that the under excited limit (UEL) can be compensated for variations in coolant conditions using a max value selection, via block 660 in FIG. 6, of a two part characteristic. A function generator (FIG. 4) which can be modified to reflect coolant conditions is used to implement the limit characteristic in the area of the capability curve less than rated generator KVA at the particular coolant condition. A straight-line limit in the constant KVA section can be compensated for coolant conditions and has been shown to provide a very good approximation to the underexcited capability curve in the area limited by rated KVA at the given coolant condition. The straight-line approximation decreases the potential for instability in the UEL caused by the very high slope of the actual capability curve, especially around unity power factor. The area of the capability curve not covered by either the OEL or UEL is from rated KVA at rated lagging power factor to rated KVA at unity power factor (curve BQ in FIG. 1). This is the area of the generator capability curve that is limited by the turbine output and by stator current heating. The exciter can only transiently affect real power requiring the exciter to reduce generator reactive output power as a means of reducing generator output KVA or generator stator current. Thus, there is needed a stator current limiter, which operates to change the setpoint of an associated automatic voltage regulator (AVR) (not shown) to reduce reactive power. In turbine ambient following applications it is desirable in accordance with the preferred embodiment to be able to bias the stator current limiter so that the limit changes as a function of coolant conditions. This is easily accomplished in the preferred implementation because a signal already exists which can be used to modify the limiter to match the change in generator capability as coolant is changed.

Specifically, HTSMAXVA is a signal that is scaled for 5000 counts at rated coolant conditions and is compensated for changes in generator terminal voltage. As coolant conditions change, this signal changes to reflect the change in generator capability. For instance, a decrease in cold gas temperature from rated on an air cooled generator will result in HTSMAXVA increasing based on the constant TMPSSB which is selected based on generator ratings for temperatures less than rated. TMPSSB is given by the equation $$TMPSSB=250{,}000*((MAXVA@T\_LOW/GEN\_MVA)^2-1)/(T\_RAT-T\_LOW) \quad (8)$$

Where MAXVA@T_LOW is the generator rating in MVA at the low temperature rating of the generator, T_RAT is the rated temperature of the generator in degrees Celsius and T_LOW is the low temperature rating of the generator in degrees Celsius.

TMPSSA is likewise given by the equation $$TMPSSA=250000*(1-(MAXVA@HI\_TEMP/GEN\_MVA)^2)/(T\_HIGH-T\_RATED) \quad (9)$$

Where MAXVA@HI_TEMP is the rating of the generator in MVA at the highest rated temperature and T_HIGH is the temperature in degrees Celsius at the highest rated temperature.

Since a stator current limit is implemented with a fixed setpoint, the stator current feedback is preferably altered in order to provide compensation for temperature. This is accomplished by using the E1PFV block, block 425 of FIG. 4, which includes the ability to divide the actual stator current feedback signal by HTSMAXVA/5000.

The preferred implementation generates an accurate representation of the generator capability for changes in coolant for both air-cooled and hydrogen cooled generators using constants H2SEXP for hydrogen cooled generators and TMPSSA and TMPSSB for air cooled generators. This change in generator capability can be used to modify the feedback variable thus permitting fixed setpoint limiters to be used.

Thus, in a preferred implementation, in the case of the OEL which involves field current, there is preferably provided a field current regulator. The OEL becomes the upper part of the generator capability curve (curve AB of FIG. 1). It is desirable that the exciter be able to transiently force more than rated field current through the generator field and thus there is provided an inverse time function to approximate the capability of the generator field to accommodate the transient field current. In accordance with the preferred embodiment, there is provided the ability to change both the limiter and protection algorithms to reflect the fact that the generator field capability changes as a function of the cooling conditions of the generator. Thus, there is coordination between the limiter and protection functions even at these non-rated coolant conditions.

The UEL (Under Excited Limiter) performs a similar function but in an area of the generator capability curve that is limited by end iron heating in the generator and steady state stability. This is basically the lower part of FIG. 1 (curves DC, DG or DK). The curve shown from point D to point C comprises the underexcited capability of the generator from zero real power to 0.95 per unit real power (point C is 1 per unit KVA at 0.95 power factor in this case). This is an empirical curve. The curve shown from points C to B is a circle with center at 0 watts and 0 vars and a radius of 1 per unit KVA. This curve is approximated with the UEL portion of the preferred embodiment using a straight line with fixed slope from point N through point Q. The straight line with fixed slope approximation is used rather than the actual circle because the slope of the circle at point Q has infinite gain (delta Q/delta P) which would result in infinite gain in the UEL regulator (not shown). A high value select circuit, block 660, is used to take the higher of the curve shown from D to C or the straight line segment from N to Q. There is no corresponding protection function for the UEL that requires coolant compensation but the instant implementation provides a very good approximation to the variation of the generator capability curve with coolant conditions.

Similar to the UEL, a stator current limit function is used to restrict operation of the generator in the area of the capability curve limited by generator stator current. This is the constant KVA area shown as the right hand part of the capability curve of FIG. 1 (curve BC) and is the same circle used by the UEL. In this case, a circle characteristic is used because the stator current limit is a set point, very low bandwidth, controller. The disclosed algorithms provide very accurate implementation of the circular generator capability curves as a function of generator cooling conditions.

While the foregoing description includes numerous details and specifics, it is to be understood that these are provided for purposes of explanation only, and are not intended to limit the scope of the invention. Those of ordinary skill in the art will easily be able to make numerous modifications to the exemplary embodiments described above without departing from the scope of the invention, as defined by the following claims and their legal equivalents.

What is claimed is:

1. An apparatus for controlling an electrical generator, comprising:
   a summing block having as inputs a rating value of said generator and a value indicative of a cooling condition of said generator;
   a circuit for calculating, based on an output of said summing block, a compensation value for limits of predetermined portions of a capability curve of said generator; and
   at least one of a ratio block and a setpoint block receiving said compensation value and outputting a feedback signal to a fixed limiter function of said generator.

2. The apparatus of claim 1, further comprising at least one of a temperature sensor and pressure sensor for monitoring said cooling condition.

3. The apparatus of claim 2, further comprising a low pass filtering connected between said sensor and said summing block.

4. The apparatus of claim 1, further comprising a switch for automatically selecting one of effecting calculations based on generator coolant temperature and coolant pressure.

5. The apparatus of claim 1, wherein said circuit comprises means for calculating a result based on a log—log relationship between generator field current and coolant pressure.

6. The apparatus of claim 1, wherein said circuit comprises a means for calculating a result based on a quadratic relationship between generator field current and coolant temperature.

7. The apparatus of claim 1, further comprising connection to inputs of at least one of an underexcited fixed limiter function, an overexcited fixed limiter function, an automatic voltage regulator and an inverse time limit and protection function.

8. The apparatus of claim 1, further comprising a scaling block connected upstream from summing block.

9. The apparatus of claim 1, wherein said apparatus controls the amount of at least one of field current and stator current in said generator.

10. The apparatus of claim 1, further comprising a normalizing circuit for normalizing said compensation value with respect to generator terminal voltage.

11. The apparatus of claim 1, further comprising a lookup table for emulating at least one portion of said capability curve.

12. The apparatus of claim 1, wherein the apparatus comprises a part of an exciter of said generator.

13. A method of controlling an electrical generator, comprising the steps of:
   determining the rating of said generator;
   monitoring a cooling condition of said generator;
   calculating, based on said rating and cooling conditions, a compensation value for limits of predetermined portions of a capability curve of said generator; and
   modifying a feedback signal to a fixed limiter function in accordance with said compensation value.

14. The method of claim 13, further comprising monitoring one of a temperature sensor and pressure sensor to monitor said cooling condition.

15. The method of claim 14, further comprising low pass filtering an output of said sensor.

16. The method of claim 13, further comprising summing a generator rating value with a value indicative of said cooling condition and employing the resulting sum as a multiplier to effect said modifying step.

17. The method of claim 13, further comprising automatically selecting one of effecting said calculating step based on generator coolant temperature and coolant pressure.

18. The method of claim 13, wherein said calculating step comprises a calculation based on a log—log relationship between generator field current and coolant pressure.

19. The method of claim 13, wherein said calculating step comprises a calculation based on a quadratic relationship between generator field current and coolant temperature.

20. The method of claim 13, further comprising varying a feedback signal to at least one of an underexcited fixed limiter function, an overexcited fixed limiter function, an automatic voltage regulator and an inverse time limit and protection function.

21. The method of claim 13, further comprising scaling a value indicative of said cooling condition.

22. The method of claim 13, further comprising controlling the amount of at least one of field current and stator current in said generator.

23. The method of claim 13, further comprising normalizing with respect to generator terminal voltage said compensation value.

24. The method of claim 13, further comprising electronically emulating at least one portion of said capability curve.

25. The method of claim 13, further comprising providing transient-forcing capability for said generator by coordinating said limiter function with a protection function of said generator.

* * * * *